(12) United States Patent
Mai

(10) Patent No.: US 6,239,999 B1
(45) Date of Patent: *May 29, 2001

(54) MULTIPLE POWER SUPPLY TRACTION SYSTEM, AND A METHOD OF IMPLEMENTATION

(75) Inventor: Serge Mai, Odos (FR)

(73) Assignee: GEC Alsthom Transport S.A., Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,530

(22) Filed: Jun. 2, 1997

(30) Foreign Application Priority Data

Jun. 4, 1996 (FR) .................................................. 96 06869

(51) Int. Cl.⁷ ........................................................ H02M 7/00
(52) U.S. Cl. ................................................ 363/125; 363/67
(58) Field of Search ............................... 363/65, 125, 67; 307/9.1; 318/139

(56) References Cited

U.S. PATENT DOCUMENTS 4,628,433 * 12/1986 Notohamiprodjo ..................... 363/65

5,521,788 * 5/1996 Miyazaki ................................ 363/65

FOREIGN PATENT DOCUMENTS

0698519A1 2/1986 (EP) .

OTHER PUBLICATIONS

W. Geissler et al, "Modelling the Three Phase Propulsion System of a Modern Multisystem–Locomotive", European Conference on Power Electronics & Applications, vol. 4, Sep. 1991, pp. 632–637.

Patent Abstracts of Japan, vol. 018, No. 151 (M–1576) Mar. 14, 1994 corresponding to JP 05 328519 A (Mitsubishi Electric Crop) dated Dec. 10, 1993.

* cited by examiner

Primary Examiner—Adolf Deneke Berhane
(74) Attorney, Agent, or Firm—Sughrue, Mion, Zinn, Macpeak & Seas, PLLC

(57) ABSTRACT

A multiple-power supply traction system capable of operating under a single-phase AC power supply and under a DC power supply, wherein a common set of capacitors is used when operating under either kind of power supply. The present invention also relates to a method of implementing such a multiple-power supply traction system.

5 Claims, 2 Drawing Sheets

MULTIPLE POWER SUPPLY TRACTION SYSTEM, AND A METHOD OF IMPLEMENTATION

The present invention relates to multiple-powersupply traction systems capable of operating under single-phase AC and under DC, and also to methods of implementing them.

BACKGROUND OF THE INVENTION

FIG. 1 shows a state of the art multiple-powersupply traction system capable of operating under single-phase AC or under DC voltage.

In order to deliver DC to the traction inverters 1, it is necessary under single-phase AC power 2 to use a transformer 3 whose secondary winding 4 is connected to an input AC/DC converter 5 feeding a common bus 6.

The common bus 6 delivers power to the traction inverters 1 and to other equipment of the train (not shown).

In general, the common bus 6 must possess large total capacitance in order to deliver a stabilized voltage to the traction inverters 1 which are voltage operated, with this applying under all degraded operating modes: sudden load shedding, loss of pantograph connection, etc.

The input single-phase AC/DC converter and rectifier 5 has an output capacitor 7.

In particular, single-phase AC/DC converter rectifiers built using IGBT components need a capacitor to be placed as close as possible in order to reduce cabling inductances.

When inputting DC power 8, the common bus 6 is either directly connected through switch 14 to a catenary 9 via a filter 10, or else it is powered via a DC/DC converter 11 that raises or lowers voltage.

While under DC power, the single-phase AC/DC converter rectifier 5 is conventionally isolated from the common bus 6 by opening an output contactor 12.

A drawback of such a prior art solution is that the multiple-powersupply traction system requires the use of an additional capacitor (not shown) while being powered under DC.

OBJECT AND SUMMARY OF THE INVENTION

Accordingly, one object of the invention is to use the capacitor 7 dedicated to the single-phase AC/DC converter rectifier 5 both when under AC power and when under DC power.

This object of the invention can be achieved by providing that the capacitor 7 dedicated to the AC/DC converter rectifier 5 should be an element forming part of the total capacitance of the common bus 6 while the system is operating under DC power, as shown, for example, in FIG. 1.

According to the invention, the output from the AC/DC converter rectifier 5 is under voltage with the output contactor 12 closed.

The AC/DC converter rectifier 5 is not running while DC power is being used.

Such a configuration can be extended to a plurality of AC/DC converter rectifier and capacitor assemblies connected in parallel with the common bus.

In addition, when a plurality of AC/DC converter rectifier and capacitor assemblies are in parallel, it is possible to modulate, i.e., increase or decrease the capacitance of the equivalent filter by configuring the contactors in appropriate manner, as shown in exemplary FIG. 2. In this manner, capacitors $C_1$, $C_2$, ... $C_n$ can be selectively added to the equivalent filter by selective use of contactors 12, 15, etc.

The above gives rise to a method of the invention for implementing a multiple-powersupply traction system.

The method of the invention for implementing the multiple-powersupply traction system is defined, when under DC power, by using said capacitor 7 that is dedicated to an AC/DC converter rectifier 5 while operating under single-phase AC.

According to the method of the invention, the AC/DC converter rectifier 5 is not running while the system is operating under DC power.

According to the invention, in the multiple-powersupply traction system capable of being powered by single-phase AC and by DC, with a common set of capacitors being used with both of said kinds of power supply, said capacitor dedicated to an AC/DC converter rectifier while operating under single-phase AC power, is also used while operating under DC power, and said AC/DC converter rectifier is not running while operating under DC power.

The traction system of the invention also satisfies at least one of the following characteristics:

the output of the AC/DC converter rectifier is connected to voltage by closing an output contactor;

the system includes a plurality of AC/DC converter rectifiers with capacitors in parallel; and the capacitance of the equivalent filter is modulated by configuring said contactors in an appropriate manner.

According to the invention, the method of implementing a multiple-powersupply traction system capable of operating under a single-phase AC power supply and under a DC power supply with a common set of capacitors being used during both of said kinds of power supply makes use, during DC power supply, of said capacitor dedicated to an AC/DC converter rectifier during operation under said single-phase AC power supply, and said AC/DC converter rectifier is not running while operating under DC power supply.

An advantage of the multiple-powersupply traction system of the invention and the method of implementing it lies in the ability of adapting the natural frequency of the filter.

Another advantage of the multiple-powersupply traction system of the invention and the method of implementing it lies in a reduction in volume, in weight, and in the number of capacitors required.

BRIEF DESCRIPTION OF THE DRAWINGS

The features of the disclosed multiple power supply traction system and method of implementation may be better understood by referring to the accompanying drawings, in which.

Figure 1:
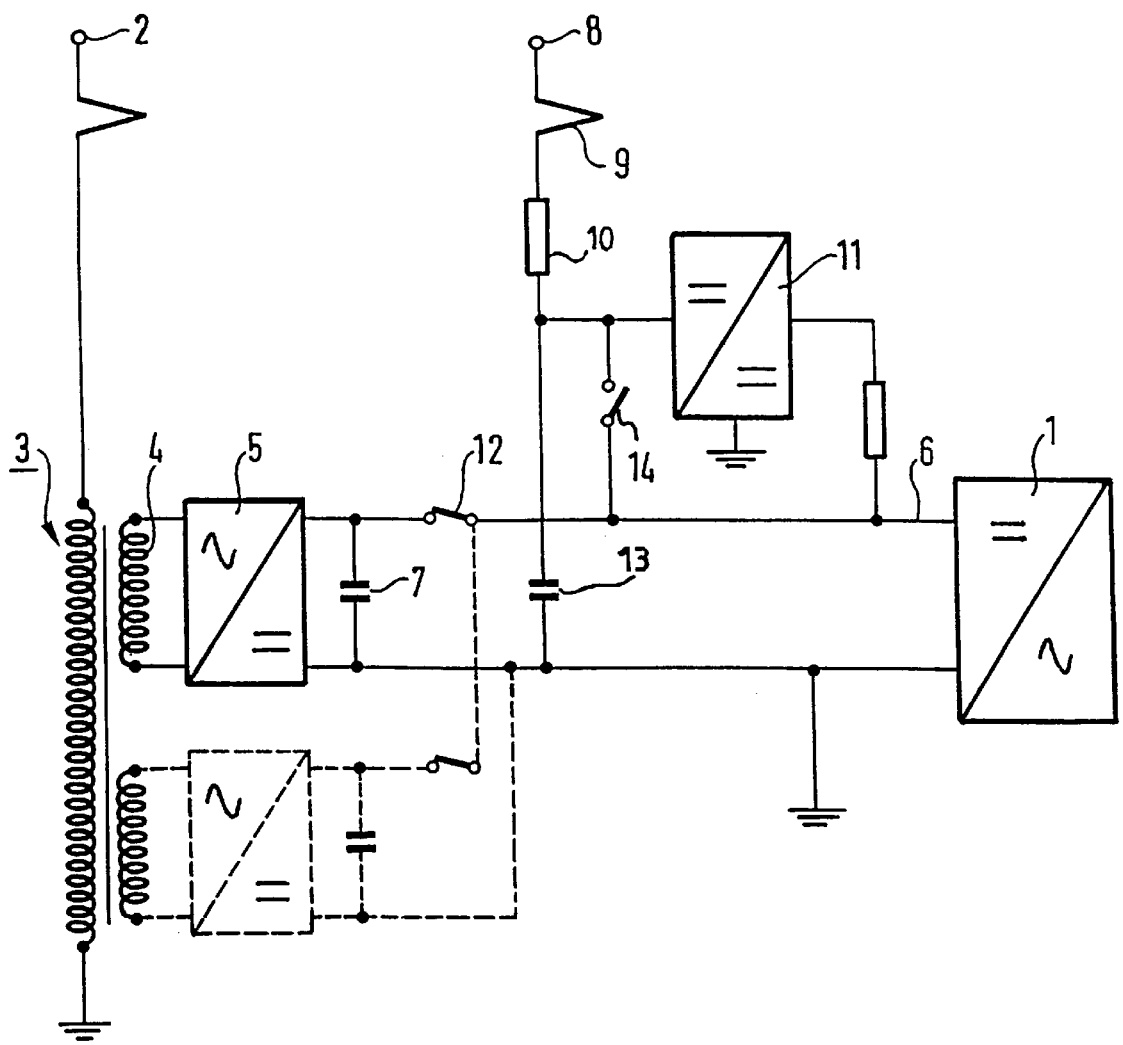
FIG. 1 is a schematic diagram of a multiple power supply traction system according to the present invention.
Figure 2:
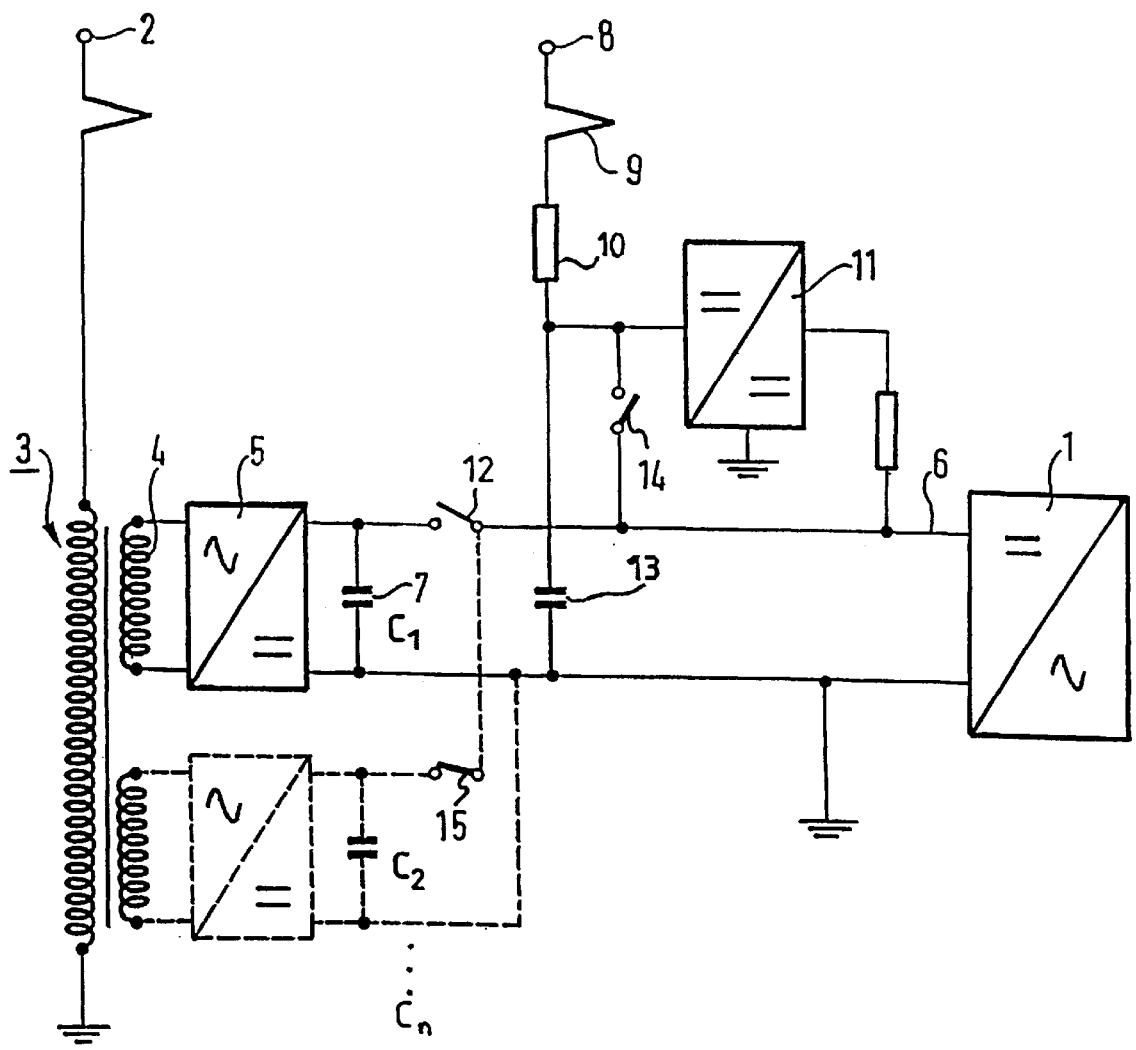
FIG. 2 is an embodiment of a multiple power supply system according to the present invention, showing modulation of an equivalent filter.

What is claimed is:

1. A multiple-power supply traction system capable of operating with an input power that is one of a single-phase AC voltage and a DC voltage, comprising:

an AC/DC converter that operates when said input power is single phase AC voltage;

a capacitor directly connected to a DC side of said AC/DC converter; and a common bus that supplies power when said system is operated with either of said input power supply voltages;

wherein said capacitor, connected to said common bus when inputting said single-phase AC voltage, is also used, while operating with said DC voltage, by being connected to said common bus, and wherein said AC/DC converter rectifier is not operational while said system is operating with said DC voltage.

2. A traction system as claimed in claim 1, further comprising a contactor, wherein said capacitor is connected to said common bus by closing said contactor.

3. A method of implementing a multiple-power supply traction system, the system being capable of operating with an input power that is one of a single-phase AC voltage and a DC voltage, comprising the steps of:

using a capacitor during operation with either of said input power supply voltages, said capacitor directly connected to the DC side of an AC/DC converter during multiple-power supply traction system operation with said single phase AC voltage, said capacitor also being used while the system is operating with said DC voltage, rendering said AC/DC converter non-operational while said multiple-power supply traction system is operating using said DC voltage.

4. A multiple-power supply traction system capable of operating with an input power that is one of a single-phase AC voltage and a DC voltage, comprising:

a common bus; and a plurality of assemblies, each assembly comprising:

an AC/DC converter that operates when said input power is single phase AC voltage;

a capacitor disposed in parallel with a DC side of the converter; and a contactor for connecting said AC/DC converter and said capacitor to said common bus;

wherein those of said capacitors connected to said common bus comprise an equivalent filter, and wherein said common bus is used when said system is operated with either of said input power supply voltages, and wherein said AC/DC converters are not operational while said system is operating with said DC voltage.

5. A traction system as claimed in claim 4, wherein the capacitance of said equivalent filter is modulated by configuring said plurality of contactors.

* * * * *